US012603982B2

(12) United States Patent
Husak et al.

(10) Patent No.: US 12,603,982 B2
(45) Date of Patent: Apr. 14, 2026

(54) STEREOSCOPIC HIGH DYNAMIC RANGE VIDEO

(71) Applicant: DOLBY LABORATORIES LICENSING CORPORATION, San Francisco, CA (US)

(72) Inventors: Walter J. Husak, Simi Valley, CA (US); Peng Yin, Ithaca, NY (US); Guan-Ming Su, Fremont, CA (US); Robin Atkins, Vancouver (CA)

(73) Assignee: DOLBY LABORATORIES LICENSING CORPORATION

( * ) Notice: Subject to any disclaimer, the term of this patent is extended or adjusted under 35 U.S.C. 154(b) by 0 days.

(21) Appl. No.: 18/862,647

(22) PCT Filed: Apr. 19, 2023

(86) PCT No.: PCT/US2023/019111
§ 371 (c)(1),
(2) Date: Nov. 4, 2024

(87) PCT Pub. No.: WO2023/215108
PCT Pub. Date: Nov. 9, 2023

(65) Prior Publication Data
US 2025/0294127 A1     Sep. 18, 2025

Related U.S. Application Data

(60) Provisional application No. 63/338,781, filed on May 5, 2022.

(51) Int. Cl.
H04N 13/161     (2018.01)
H04N 13/156     (2018.01)
(Continued)

(52) U.S. Cl.
CPC ......... H04N 13/161 (2018.05); H04N 13/156 (2018.05); H04N 13/178 (2018.05); H04N 19/597 (2014.11); H04N 19/70 (2014.11)

(58) Field of Classification Search
CPC .. H04N 13/161; H04N 13/156; H04N 13/178; H04N 19/597; H04N 19/70;
(Continued)

(56) References Cited

U.S. PATENT DOCUMENTS 9,357,197 B2 * 5/2016 Chen ..................... H04N 19/33
10,032,262 B2  7/2018 Kheradmand
(Continued)

FOREIGN PATENT DOCUMENTS

EP      3176749 B1    11/2020
WO    2014041355 A1    3/2014
WO    2021216607 W    10/2021

OTHER PUBLICATIONS

Bordes et al, "Description of SDR, HDR and 360° video coding technology proposal by Qualcomm and Technicolor—medium complexity version," Joint Video Experts Team (JVET) of ITU-T SG 16 WP 3 and 1S0/IEC JTC 1/SC 29/WG 11, 10th Meeting: San Diego, US, Apr. 10-20, 2018, Document: JVET-J0022rl, pp. 1-83.
(Continued)

*Primary Examiner* — Susan E. Hodges

(57)     ABSTRACT

Methods and systems for stereoscopic 3D video are described. Input HDR stereoscopic views in a first codeword representation are merged together by a first merging function to generate an input merged view to optimize a reshaping operation which generates a reshaped merged view in a second codeword representation and associated composer metadata. The reshaped merged view may be split and re-merged by a second frame packing function to optimize video encoding efficiency of an output coded bitstream based on the reshaped merged view. In a decoder, after
(Continued)

extracting the reshaped merged view from the coded bit-stream, a composer function applies the composer metadata to the decoded reshaped merge view to generate an output merged view in the first codeword representation. Then it generates output HDR stereoscopic views based on the output merged view.

11 Claims, 3 Drawing Sheets

(51) Int. Cl.
   *H04N 13/178*      (2018.01)
   *H04N 19/597*      (2014.01)
   *H04N 19/70*       (2014.01)

(58) Field of Classification Search
   CPC ........ H04N 19/30; H04N 19/59; H04N 19/85;
                      H04N 19/98; H04N 19/112; H04N
                                                              19/186
   USPC ............................................. 375/240; 348/43
   See application file for complete search history.

(56) References Cited

U.S. PATENT DOCUMENTS

| | | | |
|---|---|---|---|
| 10,264,287 B2 | 4/2019 | Wen | |
| 10,419,762 B2 | 9/2019 | Froehlich | |
| 10,701,375 B2 | 6/2020 | Su | |
| 10,863,182 B2 | 12/2020 | Hannuksela | |
| 11,277,627 B2 | 3/2022 | Song et al. | |
| 11,895,416 B2 | 2/2024 | Su | |
| 2011/0280316 A1* | 11/2011 | Chen ...................... | H04N 19/61 |
| | | | 375/E7.076 |
| 2016/0029044 A1* | 1/2016 | Konstantinides ...... | H04N 19/30 |
| | | | 375/240.12 |
| 2017/0140513 A1* | 5/2017 | Su .......................... | H04N 25/60 |
| 2022/0046245 A1 | 2/2022 | Kadu | |

OTHER PUBLICATIONS

Olivier et al, "HDR CE2-related: some experiments on ETM with dual grading input", Joint Collaborative Team on Video Coding (JCT-VC) of ITU-T SG 16 WP 3 and 1S0/IEC JTC 1/SC 29/WG 11 23rd Meeting: San Diego, USA, Feb. 19-26, 2016, Document: JCTVC-W0089 / m37729, pp. 1-15.

Xiu et al, "Description of SDR, HDR and 360° video coding technology proposal by InterDigital Communications and Dolby Laboratories" Joint Video Experts Team (JVET) of ITU-T SG 16 WP 3 and ISO/IEC JTC 1/SC 29/WG 11, 10th Meeting: San Diego, US, Apr. 10-20, 2018, Document: JVET-J0015-vl, pp. 1-82.

Yan Ye "Recent trends and challenges in 360-degree video compression," Hot 3D, 9-th workshop on hot topics in 3D (Hot3D), 2018.

* cited by examiner

STEREOSCOPIC HIGH DYNAMIC RANGE VIDEO

CROSS-REFERENCE TO RELATED APPLICATIONS

This application is a U.S. National Stage application under U.S.C. 371 of International Application No. PCT/US2023/019111, filed on Apr. 19, 2023, which claims the benefit of priority to U.S. Provisional Patent Application No. 63/338,781, filed on May 5, 2022, which is incorporated by reference in its entirety.

TECHNOLOGY

The present invention relates generally to images. More particularly, an embodiment of the present invention relates to techniques for the stereoscopic transmission of high dynamic range video.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma $Y$ and chroma $Cb$ and $Cr$) wherein each color component is represented by a precision of n-bits per pixel (e.g., n=8). For example, using gamma luminance coding, images where $n \leq 8$ (e.g., color 24-bit JPEG images) are considered images of standard dynamic range, while images where $n \geq 10$ may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

The creation and playback of high dynamic range (HDR) content is now becoming widespread as HDR technology offers more realistic and lifelike images than earlier formats. It is expected that stereo HDR in combination with volumetric video will provide a more immersive experience. To improve existing coding schemes, as appreciated by the inventors here, improved techniques for the stereoscopic transmission and display of stereoscopic HDR video are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figures 1A, 1B:
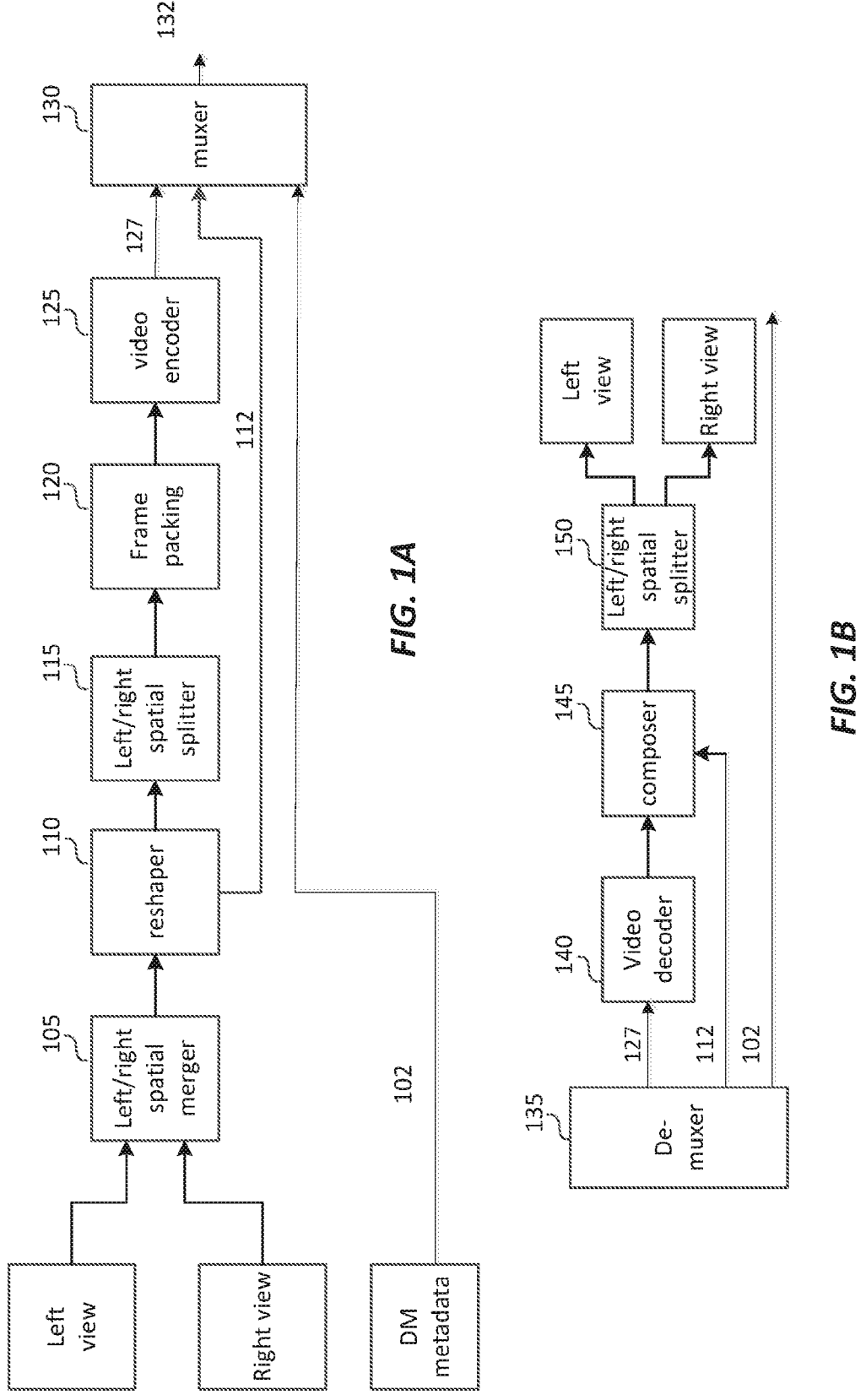
FIG. 1A depicts an encoding process for stereoscopic HDR video according to a first example embodiment of the present invention.
FIG. 1B depicts a decoding process for stereoscopic HDR video according to a first example embodiment of the present invention.

Methods for the stereoscopic HDR video coding and decoding are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to methods for a stereoscopic HDR video pipeline. In an embodiment, a processor receives a first view and a second view of a scene in a first codeword representation;

applies a merging function to merge the first view and the second view into an input merged view in the first codeword representation;

applies a reshaping process to the input merged view to generate a reshaped merged view in a second codeword representation and composer metadata, wherein the composer metadata allow a composer function operating on the reshaped merged view to generate an output approximating the input merged view in the first codeword representation;

applies a split function to the reshaped merged view to generate a first reshaped view and a second reshaped view in the second codeword representation;

encodes the first reshaped view and a second reshaped view to generate a coded bitstream;

and combines the coded bitstream and the composer metadata to generate a coded output.

In a second embodiment, a processor receives a bitstream comprising reshaped coded data in a second codeword representation and composer metadata;

demultiplexes the bitstream to extract the reshaped coded data and the composer metadata;

decodes the reshaped coded data to generate a reshaped merged view in the second codeword representation;

applies a composer function to the reshaped merged view to generate based on the composer metadata an output merged view in a first codeword representation; and generates based on the output merged view an output first view and an output second view in the first codeword representation.

Stereo HDR Video Architecture

FIG. 1 depicts an example embodiment for an encoding pipeline for stereoscopic video. As used herein, the term "metadata" relates to any auxiliary information that is transmitted as part of a coded bitstream or sequence and assists a decoder to render a decoded image. Such metadata may include, but are not limited to, color space or gamut information, reference display parameters, and auxiliary signal parameters, as those described herein.

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

As depicted in FIG. 1, the source content includes a left view, a right view, and metadata (102) to assist in proper display management (DM). For example, such metadata may include "L1 metadata," denoting minimum, medium, and maximum luminance values related to an input frame or image. L1 metadata may be computed by converting RGB data to a luma-chroma format (e.g., YCbCr) and then computing min, mid (average), and max values in the Y plane, or they can be computed directly in the RGB space. For example, in an embodiment, L1Min denotes the minimum of the PQ-encoded min (RGB) values of the image, while taking into consideration an active area (e.g., by excluding gray or black bars, letterbox bars, and the like). min (RGB) denotes the minimum of color component values {R, G, B} of a pixel. The values of L1Mid and L1Max may also be computed in a same fashion replacing the min( ) function with the average( ) and max( ) functions. For example, L1Mid denotes the average of the PQ-encoded max (RGB) values of the image, and L1Max denotes the maximum of the PQ-encoded max (RGB) values of the image. In some embodiments, L1 metadata may be normalized to be in [0, 1].

Given the two views, a merger unit (105) merges the left view and right view. The merging can be done horizontally or vertically, and the details (depending on detection of letterbox and pillar boxes) will be explained later. The merger packs left-view video (with dimension H×W) and right-view video (with dimension H×W) together into a single frame. This merging is performed to optimize the efficiency of the reshaper (110). The packed image is passed through the reshaper (110) to generate the reshaped video and corresponding composer metadata (112). The reshaped bitstream is passed through a video codec (125) (e.g., HEVC, VVC, and the like) for compression. A muxer (130) will multiplex the coded video bit stream (127) with the composer metadata (112), and the DM metadata (102) to generate an output bitstream (132).

The output of the reshaper (110) is the merged reshaped signal. In certain embodiments, in spatial splitter 115, it might be split back into left view and right views, and go through another frame packing process (120), this time to optimize video encoding (125). For example, depending on the required encoding format, frame packing options include:

Full resolution of each view in a side by side packing format with a coded frame resolution of H×2 W.

Down-sampling of each view horizontally, with dimension H×(W/2), and packing them side by side (SbS) with final image resolution H×W.

Down-sampling of each view vertically, with dimension (H/2)×W, and packing them top-and-bottom (TaB) with final image resolution H×W.

In an embodiment, the splitter unit (115) and the frame packing unit (120) may be removed from the pipeline if the output format of the spatial merger unit 105 matches the frame packing format to be used for video encoding.

Note that if half resolution (either horizontal down-sampling or vertical down-sampling) is chosen, one can also perform the resolution reformatting before the left/right view merger to reduce the computation of reshaping by half. Note that the merger (105) and frame packing (120) can have different formats. For example, the left/right view merger can merge views using TaB to facilitate the reshaping, but the frame packing (120) can split the left and right and re-merge them as SbS for packing to improve coding efficiency or other concerns.

The composer coefficients (112) will be generated from a single, merged frame, to ensure the same reshaping function is applied to both views.

FIG. 1B depicts an example embodiment of the decoding process. The decoder side performs the opposite operation. After demultiplexing (135) a suitable video decoder (140) (matching the encoder 125) will decode the bitstream to get the reshaped signal. Then, a composer (145) will apply the composer metadata (112) to the decoder signal to reconstruct the HDR signal. Finally, a splitter 150 will recreate the two views. Display metadata 102 may be passed directly to the display management process (not shown).

Figures 2A, 2B:
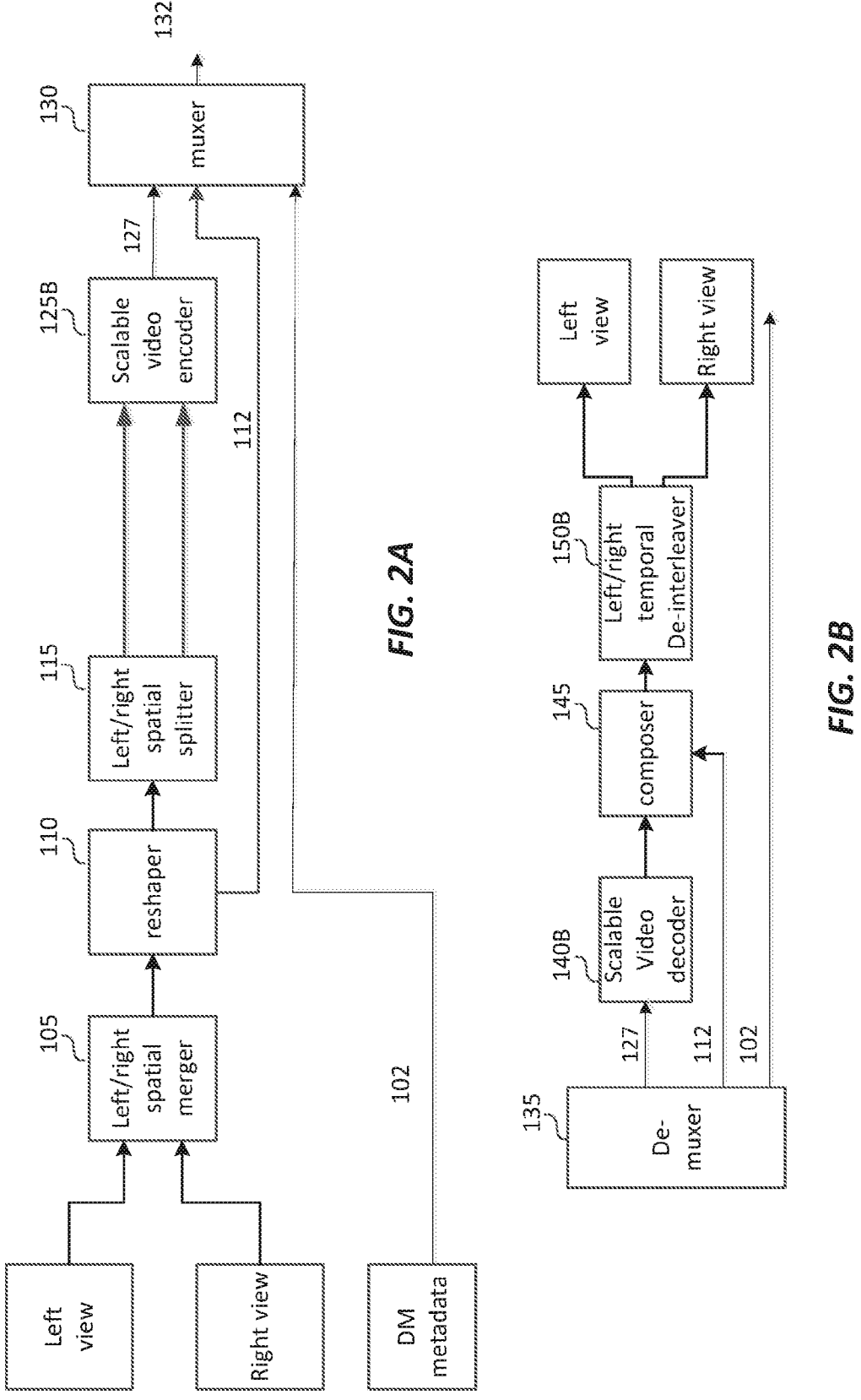
FIG. 2A and FIG. 2B depict encoding and decoding processes for stereoscopic HDR video according to second example embodiments of the present invention.

FIG. 2A depicts an alternative embodiment of the encoding process by utilizing a scalable video encoder (125B) (e.g., using HEVC temporal scalability). At the encoder side, for a given left/right pair, one will spatially merge them into a single frame and perform the reshaping. The composer coefficients will be generated from this single merged frame. Then, in block 115, one will split this merged frame to left and right reshaped images. The left view will be encoded as the first temporal sub-layer and the right view will be encoded as the second temporal sub-layer.

At the decoder side, as depicted in FIG. 2B, after demultiplexing (135), the scalable video decoder (140B) will generate two temporal sub-layers which will be passed to the composer (145) to generate the reconstructed HDR images. Then, in unit 150B, one will temporally split the left and right view for subsequent post-processing and display.

Figures 2C, 3:
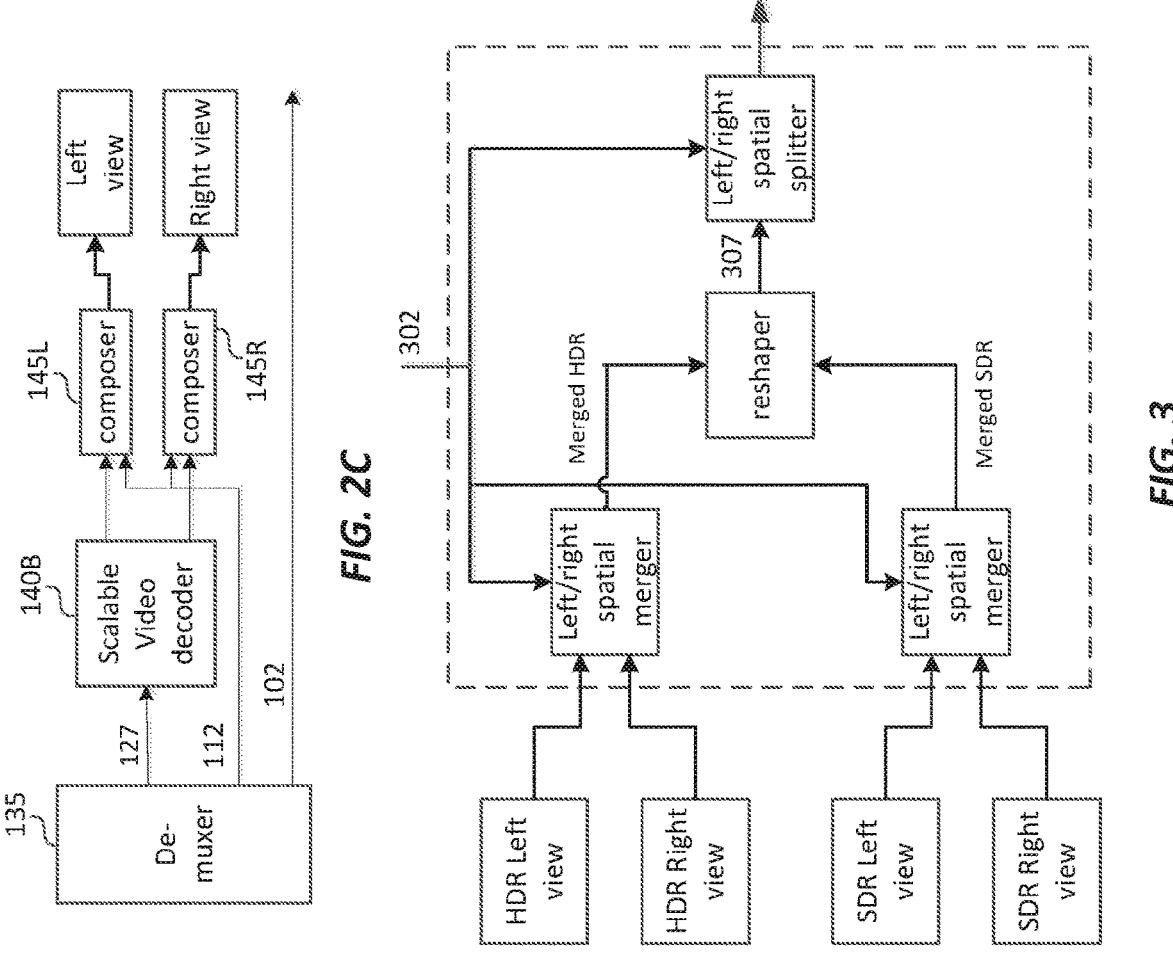
FIG. 2C depicts a decoding process for stereoscopic HDR video according to a third example embodiment of the present invention.
FIG. 3 depicts merging left and right stereoscopic views before reshaping according to an example embodiment of the present invention.

Other decoder implementations are also feasible, such as having the output of the scalable video decoder (140B) output to two buffers, and each one processed by its own composer. Thus, one has two composers (145L, 145R) operating at half speed. This alternative is depicted in FIG. 2C.

In an alternative embodiment one may use a multiview encoder (such as the multi-view HEVC encoder). In such a scenario, in FIG. 2B, instead of using a scalable video encoder (125B) one may replace it with a Multiview video encoder. Similarly, for the decoder, in FIG. 2C one may replace the scalable video decoder (140B) with a Multiview video decoder.

The Stereo Reshaper

As described earlier, the input to the reshaper is a merged representation of the left and right views. One straightforward way to perform reshaping and obtain the composer coefficients is to run a reshaper on each view individually. However, since the operation of reshaping is content dependent, this approach will generate different composer coefficients for each view. To ensure both views share the same forward and backward reshaping function, it is better if the reshaper input takes the merged left and right view as a single image. By doing so, the statistics in both views are considered together and the reshaping functions will be the same for both views. A variety of compatibility scenarios are examined first.

Non Backwards Compatibility (NBC)

In the context of this disclosure, backwards compatibility refers to whether a decoder needs to be able to view an SDR version of the incoming content—that is, the incoming input is visible even if the decoder can't apply reverse or backward reshaping. In a non-backwards compatible system, the decoder is required to apply the reshaping metadata (112) to generate a viewable HDR output.

In an embodiment, an NBC codec core takes a single image in and computes block-based statistics and techniques (e.g., see Ref. [1-2]) to determine the required number of codewords in each luminance range. Using that information, one can build a forward look-up table (LUT) to reshape the input HDR signal to a lower bit depth in the reshaped domain. The reshaper will also output composer coefficients, which allow a decoder to construct the reverse-reshaping LUT, to reconstruct the HDR signal. To re-use this single-view functionality to stereo signals, one can merge the left view and the right view together and send it to a single-view NBC codec to output the reshaped stereo video and corresponding metadata. Though both side-by-side merge and top-and-bottom merge are feasible, note that a typical system may also have letterbox and pillar box detectors to exclude those non-texture dark areas from the reshaping operations. To make the existing detector work without modification, if the video has letterbox (top and bottom black bars), it is preferred to have side-by-side merge format. If the video has pillar box (left and right black bars) detection, then a top-and-bottom merge format is preferred. Thus, at the output of merger 105 the output image will be either the two views positioned side by side or the two views positioned top-to-bottom.

After reshaping, in unit 115, the reshaped merged video can be split again to reshaped left view and right views, depending on the choice of the next-stage video encoder (125).

Single Layer Backwards Compatibility (SLBC)

When coding HDR video in SLBC format, the top design priority is to preserve the fidelity of the HDR content. Thus, while an SDR version is created, the reshaping is optimized to preserve the original HDR view as much as possible. Depending on the availability of SDR-video versions during the reshaping process, there are two types of SLBC codecs. These will be discussed separately.

Reference SDR is Available

When both reference SDR and HDR images for the same view are available, a single-view SLBC reshaping algorithm may take one HDR frame and one SDR frame as inputs and generates the reshaped SDR and the corresponding composer coefficients. If a device does not have HDR playback, it can still play the SDR base layer. Alternatively, an HDR decoder can apply the composer metadata to reconstruct the HDR signal.

The single-view SLBC algorithm performs CDF matching by building a mapping curve to match the histogram between HDR and SDR versions of the input images (e.g., see Refs [3-4]). The algorithm also builds a dynamic 3D mapping table (d3DMT) by scanning the chroma color components to solve for proper composer-related metadata (Ref. [5]). As depicted in FIG. 3, one can merge the left view HDR and right view HDR as a single HDR image. In addition, one also merges the left view SDR and right view SDR to a single SDR image. Then, one can re-use the forward reshaping to output the reshaped SDR signal. The corresponding composer coefficients are also outputted.

Similar to the NBC case, the SLBC pipeline may have a letterbox/pillar box detector. So, depending on the box type, a control signal (302) may be used to control whether merging is performed in SbS or TaB formats. As before, the reshaped merged SDR (307) signal can be split to left and right views after the reshaper, depending on the choice of the next-stage video codec.

Reference SDR is not Available

When the reference SDR is not available, the reshaper operates only on the HDR input to generate the reshaped SDR output and corresponding composer coefficients. Similarly to the NBC case, one can merge the left view HDR and right view HDR as input; and pass the merged HDR picture to a non-reference SLBC codec (e.g., see Refs [6-7]) to output the merged reshaped SDR and composer coefficients. As before, the reshaped merged SDR image can be split to left and right views after the reshaper, depending on the choice of the next-stage video codec.

Single Layer Inverse Display Mapping (SLiDM)

In certain HDR Profiles (as in Dolby Vision Profile 8.4), the original content is in SDR format. While a decoder can reconstruct an HDR version, the reshaping is optimized to preserve the original SDR content. In such formats an encoder may apply an inverse mapping technique (say, inverse tone mapping or inverse display management) to generate an HDR signal (Ref. [4]). If both SDR and HDR versions are available (Ref. [4]), then the merging of the left and right views is identical to the process described for the SLBC codec (see FIG. 3). If there is no HDR signal available (Ref. [8]) and static mapping from SDR to HDR is chosen, the available SDR signal is transmitted as is, thus there is no need to include units 105 and 115. Reshaping coefficients are simply multiplexed together with the coded stereoscopic signal.

For example, in Dolby Vision Profile 8.4 which convert HLG to PQ, this mode operates as an EOTF conversion, so one does not need access to the video content. The composer coefficients are static for the entire video sequence. In other profiles, one can create the HDR version from SDR using dynamic composer coefficients. The coefficients are created according to the content and features. In this case, one will need to merge the left and right view and perform content analysis to generate proper metadata 112.

Stereo Coding Details

As discussed earlier, a video encoder 125 may be one of a single-layer encoder, a scalable encoder, or a multi-view encoder. These options are discussed in this section with more detail. Without loss of generality, additional details will be described using HEVC (Ref. [9]) as an example; however, the same ideas can be applied to other codecs, such as AVC, AV1, VVC, and the like. For this discussion, it is assumed that the left view is the base view and the right view is an enhancement view. HEVC specifies three methods to support stereo 3D encoding.

The first method is to use a frame packing arrangement SEI message for single layer HEVC. It supports side-by side (SbS), top-bottom (TaB) and temporal interleaving (TI), as indicated in Table D.8 of Ref. [9], for the syntax definition of the syntax parameter frame_packing_arrangement_type.

For SbS, the spatial resolution of the original video is reduced by half horizontally. For TaB, the spatial resolution of the original video is reduced by half vertically. At a decoder, up-conversion processing is performed to recover the decoded video to the original resolution.

When using temporal interleaving, the frames preserve the original resolution; however, the video frame rate is doubled to enable stereo 3D by interleaving the two views. At the decoder, a left view is extracted from the even numbered frames and the right view is extracted from the odd numbered frames, or vice versa. In practice, for 8k×2k× 96 Hz content, such an approach would requires using HEVC Main10, Level 6.2.

Temporal Scalability

The second option is to use temporal sublayers to support stereoscopic video coding in a single layer HEVC. For example, in such a scenario the left view is coded with even frames and the right view is coded with odd frames. Such a solution also supports backward compatibility for single view case, i.e., the decoder can decode only left view.

In an embodiment, suppose the greatest value of TemporalId is set equal to max TemporalId (maxTemoralId>0), the right view is coded with the TemporalId equal to max TemporalId and the left view is coded with TemporalIds smaller than maxTemporalID.

To be specific, in the sequence parameter set (SPS), the syntax sps_max_sub_layers_minus1 is signalled. Signal sps_max_sub_layers_minus1 plus 1 specifies the maximum number of temporal sub-layers that may be present in each coded video sequence (CVS) referring to the SPS. In an embodiment, one can set maxTemporalId equal to the value of sps_max_sub_layers_minus1.

In the network abstraction layer (NAL) unit header, TemporalId is signalled by the syntax nuh_temporal_id_plus1, defined as: nuh_temporal_id_plus1 minus 1 specifies a temporal identifier for the NAL unit. The value of nuh_temporal_id_plus1 is set equal to TemporalId+1.

Hence, for the right view, TemporalId is set equal to max TemporalId. For the left view, TemporalId is set smaller than maxTemporalId but larger or equal to 0. With this setting, backward compatibility is supported by extracting a bit-stream with TemporalId smaller than max TemporalId.

To code the temporal interleaving video more efficiently, the following encoder settings are proposed:

1) for inter-view prediction, if the left view decoded picture is used for predicting the right view picture, the left view reference picture should be marked as long-term reference pictures. In particular, to align with MV-HEVC design, only the left view decoded picture with the same time instance should be used for the long-term reference picture for the right view.

2) QP adaptation: for conventional temporal scalability, in general higher QP is used for highest temporal sublayer. In this application, since the highest temporal sublayer is used to code the right view, QP rule should be adjusted to have the best stereoscopic quality.

The main reason behind 1) is because of picture order count (POC) setting in the proposed embodiment.

1) POC: By definition, at the same time instance, left view and right view should have the same POC. In the proposed solution, one needs to assign the POC based on temporal interleaving and the meaning of POC between left view and right view does not have real temporal meaning anymore.

2) POC impact on coding: in HEVC, in merge or advance motion vector prediction (AVMP) mode, a list of candidates is created from the motion information of spatial or temporal neighbour prediction blocks. In this process, motion vectors (MVs) from neighbour blocks may be temporally scaled using POC. Since the POC is fake now, to not hurt coding efficiency, one needs to mark the inter-view reference picture as the long term reference pictures which disable scaling of MVs associated with long-term reference pictures.

As an example, in HDR coding, to associate metadata with the left and right views, one needs to check nuh_temporal_id_plus1 to differ between the left and right view and use POC order and POC difference to associate left and right view which has the same time instance.

For example, if POC1 is assigned to left view, one needs to look for the associated right view. The right view POC2 should have the following properties:

1) POC2 is larger than POC1 and has the smallest POC gap with POC1;

2) nuh_temporal_id_plus1 equal to maxTemporalId+1.

In the case of supporting temporal scalability, the proposed solution needs to be adjusted to allow additional temporal sub-layer indication within the left and right views. In this case, it might be much simpler to use frame packing arrangement SEI message and MV-HEVC solution to not confuse the intention.

Such temporal scalability case can be as follows: for example, most of a film is created at 24 fps, but a few scenes at 96 fps. Not all decoders can support 96 fps so one may want a compatible 24 and extra 96 just for compatible decoders. One could set a 24 fps base frame rate and use temporal scalability just for the scenes at 96 fps.

In practice, for 4k×2k×192 fps, such an implementation requires HEVC Main10 Level 6.1.

MV-HEVC

HEVC has two extensions to support 3D video: MV-HEVC and 3D-HEVC. The multi-view extension, MV-HEVC, allows efficient coding of multiple camera views and associated auxiliary pictures by reusing single-layer decoders without changing the block-level processing modules. It allows inter-view prediction by only high-level syntax (HLS) changes. The 3D video extension, 3D-HEVC, targets a coded representation for both multiple views and associated depth maps. It involves the changes of low-level coding tool modules. MV-HEVC currently only supports Multiview Main Profile. In practice, to support HDR, it requires defining Multiview Main 10 Profile, or Stereo Main 10 Profile for stereoscopic video.

Support of 360 degree video (3DoF)

The above solutions can also be extended to support 360 degree video. The standardized compression scheme for a 360 degree video is to first project it to a 2D plane and then apply a compression scheme for a 2D video. A typical delivery workflow is as follows (Ref. [10]):

A multi-camera array captures video, then image stitching is applied to obtain spherical video Spherical video is "unfolded" to the 2D plane, e.g., using the projection, such as the equirectangular (ERP) or cube map, and the like Video encoding using HEVC, AVC, VVC, and the like, followed by packaging and delivery At the receiver, receiving 2D video and unpackage and decode it Project 2D plane back to sphere given specific viewpoint Render on a display Therefore, from a coding and delivery point of view, a 2D 360-degree video has no difference from 2D plane video. For stereoscopic delivery for 360-degree HDR video, the above solutions can be applied.

REFERENCES

Each of these references is included by reference in its entirety.

1. U.S. Pat. No. 10,419,762, "Content-adaptive perceptual quantizer for high dynamic range images."
2. U.S. Pat. No. 10,032,262, "Block-based content-adaptive reshaping for high dynamic range images."
3. U.S. Pat. No. 10,701,375, "Encoding and decoding reversible production-quality single-layer video signals."
4. U.S. Pat. No. 10,264,287, "Inverse Luma/Chroma mappings with histogram transfer and approximation."
5. U.S. Pat. No. 11,277,627, "High-fidelity full reference and high-efficiency reduced reference encoding in end-to-end single-layer backward compatible encoding Pipepeline."
6. US Patent Application Publication 2022-0046245-A1, "Interpolation of reshaping functions."
7. WIPO PCT Patent Application Publication WO 2021/216607, "Reshaping functions for HDR imaging with continuity and reversibility constraints."
8. U.S. patent application Ser. No. 17/630,901, "Electro-optical transfer function conversion and signal legalization," filed on 27 Jan. 2022, G-M. Su, et al.
9. ITU-T Rec. H.265, "High efficiency video coding," ITU, version 08/2021.
10. Y. Ye, "Recent trends and challenges in 360-degree video compression". HOT 3D, 9-th Workshop on Hot Topics in 3D (Hot3D), 2018.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to stereoscopic HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to stereoscopic HDR video processes as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to stereoscopic HDR video processes are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding stereoscopic high-dynamic range (HDR) video, the method comprising:

receiving a first view and a second view of a scene in a first codeword representation;

applying a merging function to merge the first view and the second view into a first merged view in the first codeword representation, the merging function employing a first frame-packing format;

applying a reshaping process to the first merged view to generate a reshaped merged view in a second codeword representation and composer metadata, wherein the composer metadata allow a composer function operating on the reshaped merged view to generate an output approximating the first merged view in the first codeword representation;

applying a split function to the reshaped merged view to generate a first reshaped view and a second reshaped view in the second codeword representation;

merging the first reshaped view and the second reshaped view into a second merged view using a different second frame-packing format;

encoding the second merged view to generate a coded bitstream; and combining the coded bitstream and the composer metadata to generate a coded output.

2. The method of claim 1, wherein the first merged view comprises a side-by-side arrangement of the first view and the second view or a top-and-bottom arrangement of the first view and the second view.

3. The method of claim 2, wherein side-by-side merging is applied when the first view and the second view are in a letterbox format; and wherein top-and-bottom merging is applied when the first view and the second view are in a pillar format.

4. The method of claim 1, wherein encoding the second merged view comprises:

frame packing the second merged view in a single frame according to the different second frame-packing format; and compressing the single frame using a video coder and supplemental enhancement information (SEI) messaging indicating the different second frame-packing format.

5. The method of claim 1 wherein encoding the second merged view comprises employing temporal interleaving.

6. The method of claim 1 wherein encoding the second merged view comprises employing scalable video coding, multiview coding, or 3D coding.

7. The method of claim 6, wherein encoding with scalable video coding comprises:

setting for the second reshaped view a TemporalId equal to maxTemporalId; and setting for the first reshaped view the TemporalId smaller than the max TemporalId but larger or equal to 0.

8. The method of claim 1, wherein the reshaping process further comprises:

receiving a first SDR view and a second SDR view of the scene;

applying the merging function to merge the first SDR view and the second SDR view into an SDR merged view; and applying the reshaping process using both the SDR merged view and the first merged view to generate the reshaped merged view in the second codeword representation and the composer metadata.

9. An apparatus comprising a processor and configured to perform the method recited in claim 1.

10. A non-transitory computer-readable storage medium having stored thereon computer-executable instruction for executing a method with one or more processors in accordance with claim 1.

11. The method of claim 1, wherein the first frame-packing format is selected to optimize efficiency of the reshaping process; and wherein the second frame-packing format is selected to optimize the encoding.

* * * * *